Figure 1:
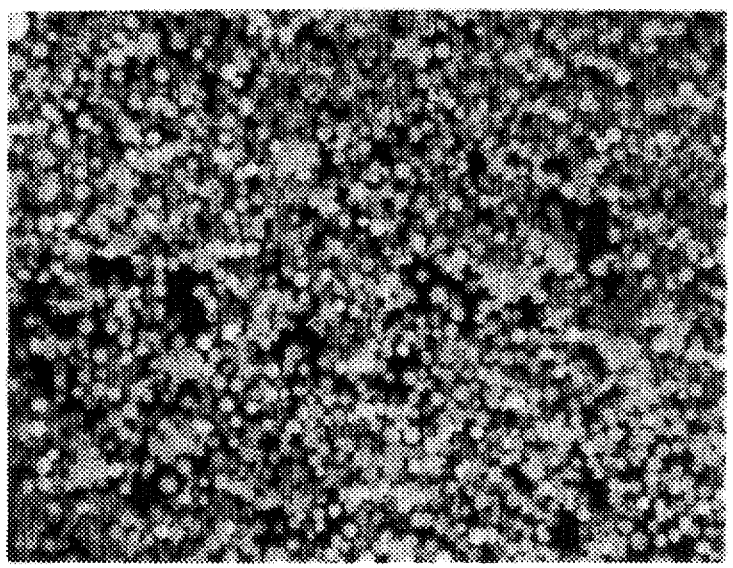

United States Patent [19]

Sacchetti et al.

[11] Patent Number: 5,759,940

[45] Date of Patent: *Jun. 2, 1998

[54] COMPONENTS AND CATALYSTS FOR THE POLYMERIZATION OF OLEFINS

[75] Inventors: Mario Sacchetti, Ferrara; Stefano Pasquali, San Marco; Gabriele Govoni, Renazzo, all of Italy

[73] Assignee: Montell Technology Company BV, Hoofddorp, Netherlands

[*] Notice: The term of this patent shall not extend beyond the expiration date of Pat. No. 5,691,264.

[21] Appl. No.: 409,846

[22] Filed: Mar. 27, 1995

[30] Foreign Application Priority Data

Mar. 29, 1994 [IT] Italy .................................. MI94A0596

[51] Int. Cl.$^6$ .............................. B01J 31/36; B01J 31/38
[52] U.S. Cl. ...................... 502/134; 502/118; 502/129; 502/133
[58] Field of Search .................... 502/134, 129, 502/133, 118

[56] References Cited

U.S. PATENT DOCUMENTS

| | | |
|---|---|---|
| 2,827,446 | 3/1958 | Breslow . |
| 2,924,593 | 2/1960 | Breslow . |
| 4,220,554 | 9/1980 | Scantá et al. . |
| 4,298,718 | 11/1981 | Mayr et al. . |
| 4,399,054 | 8/1983 | Ferraris . |
| 4,495,338 | 1/1985 | Mayr et al. . |
| 4,542,198 | 9/1985 | Mayr et al. . |
| 4,542,199 | 9/1985 | Kaminsky et al. . |
| 5,106,804 | 4/1992 | Bailly et al. . |
| 5,132,262 | 7/1992 | Rieger et al. . |
| 5,162,278 | 11/1992 | Razavi . |

FOREIGN PATENT DOCUMENTS

| | | | |
|---|---|---|---|
| 0 129 368 | 12/1984 | European Pat. Off. . | |
| 0 185 918 | 7/1986 | European Pat. Off. . | |
| 0 395 083 | 10/1990 | European Pat. Off. . | |
| 0 436 328 A2 | 7/1991 | European Pat. Off. | C08F 4/606 |
| 0 439 964 | 8/1991 | European Pat. Off. . | |
| 0 447 070 A1 | 9/1991 | European Pat. Off. | C08F 10/02 |
| 0447070 | 9/1991 | European Pat. Off. | C08F 10/00 |
| 0 318 048 | 5/1992 | European Pat. Off. . | |
| 0 485 820 | 5/1992 | European Pat. Off. . | |
| 0 485 822 | 5/1992 | European Pat. Off. . | |
| 0 485 823 | 5/1992 | European Pat. Off. . | |
| 0 509 944 | 10/1992 | European Pat. Off. . | |
| 0 519 237 | 12/1992 | European Pat. Off. . | |
| 0 522 281 | 1/1993 | European Pat. Off. . | |
| 0 553 806 | 1/1993 | European Pat. Off. . | |
| 0 549 900 | 7/1993 | European Pat. Off. . | |
| 0 553 805 | 8/1993 | European Pat. Off. . | |
| 0 563 917 A1 | 10/1993 | European Pat. Off. | C08F 10/00 |
| 63-168408 | 12/1988 | Japan . | |

Primary Examiner—Glenn A. Caldarola
Assistant Examiner—Alexander G. Ghyka
Attorney, Agent, or Firm—Bryan Cave LLP

[57] ABSTRACT

The present invention relates to components of catalysts for the polymerization of olefins comprising the product that can be obtained by bringing a compound of a transition metal M, containing at least one M—π bond, into contact with an olefinic prepolymer obtained by polymerization of one or more olefins with a coordination catalyst comprising a compound of Ti or V supported on a magnesium halide.

23 Claims, 1 Drawing Sheet

COMPONENTS AND CATALYSTS FOR THE POLYMERIZATION OF OLEFINS

The present invention relates to components of catalysts for the polymerization of olefins, the catalysts obtained from them and the use of said catalysts in the polymerization of olefins $CH_2=CHR$ in which R is hydrogen or an alkyl, cycloalkyl or aryl radical with 1–12 carbon atoms.

Another aspect of the present invention relates to the polymers obtained using said catalysts.

Coordination catalysts obtained from compounds $ML_x$, in which M is a transition metal and in particular Ti, Zr and Hf, L is a ligand coordinating the metal, x is the valence of the metal and at least one of the ligands L has cycloalkadienyl structure, are known from the literature. Catalysts of this type using compounds $Cp_2TiCl_2$ or $Cp_2ZrCl_2$ (Cp=cyclopentadienyl) are described in U.S. Pat. Nos. 2,827,446 and 2,924,593. The compounds are used together with Al-alkyl compounds in the polymerization of ethylene. The catalytic activity is very low. Catalysts with very high activity are obtained from compounds $Cp_2ZrCl_2$ or $Cp_2TiCl_2$ and from their derivatives substituted in the cyclopentadienyl ring, in which the Cp ring can also be condensed with other rings, and from polyalumoxane compounds containing the repeating unit —(R)AlO—, in which R is lower alkyl, preferably methyl (U.S. Pat. No. 4,542,199 and EP-A-129368).

Catalysts of the aforementioned type in which the metallocene compound contains two indenyl or tetrahydroindenyl rings bridge-bonded through lower alkylenes or through other divalent radicals are suitable for preparation of stereoregular polymers of propylene and of other alpha olefins (EP-A-185918).

Stereospecific catalysts are also obtained from dicyclopentadienyl compounds in which the two rings are substituted in various ways with groups with steric hindrance so as to prevent rotation of the rings about the axis of coordination with the metal.

Substitution of indenyl or tetrahydroindenyl at suitable positions of the pentadienyl ring gives catalysts that have very high stereospecificity (EP-A-485823, EP-A-485820, EP-A-519237, U.S. Pat. No. 5,132,262 and U.S. Pat. No. 5,162,278).

The metallocene catalysts described above yield polymers with very narrow molecular weight distribution (Mw/Mn around 2).

Some of these catalysts also have the property of forming copolymers of ethylene with alpha olefins of the LLDPE type or ethylene/propylene elastomeric copolymers with very uniform distribution of the comonomer units. The LLDPE polyethylene obtained is further characterized by low solubility in solvents such as xylene or n-decane.

The polypropylene obtained with the more stereospecific catalysts mentioned above exhibits increased crystallinity and a higher deformation temperature compared with the polymer that can be obtained with conventional Ziegler-Natta catalysts.

However, these metallocene catalysts present a notable difficulty with respect to the possibility of being used in industrial processes for production of polyolefins that are not carried out in solution, due to the fact that they are soluble in the reaction medium in which they are prepared and in the liquid polymerization medium.

In order to be able to use them in polymerization processes that are not performed in solution, the catalysts must be supported on suitable supports which endow the polymer with appropriate morphological properties.

Many kinds of supports are used including, among others, porous metal oxides such as silica or porous polymeric supports such as polyethylene, polypropylene and polystyrene. Magnesium halides are also used as support. In some cases they are also used as counter-ions of an ion pair in which the metallocene compound supplies the cation and a compound of the Mg halide type supplies the anion.

Use of a support tends, however, to lower the activity of the catalysts considerably. Japanese application No. 168408/88 (published Dec. 7, 1988) describes the use of magnesium chloride as support of metallocene compounds of the type $Cp_2TiCl_2$, $Cp_2ZrCl_2$, $Cp_2Ti(CH_3)_2$ for forming, with Al-trialkyl and/or polymethylalumoxane (MAO), catalysts for polymerization of ethylene. The component comprising the magnesium chloride is prepared by grinding it together with the metallocene compound, also working in the presence of electron-donor compounds or supporting the metallocene on a suitable liquid adduct of $MgCl_2$ with an alcohol and subsequent reaction with $AlEt_2Cl$. The catalysts do not have sufficiently high activity with respect to $MgCl_2$.

Catalysts comprising a metallocene compound of the $Cp_2ZrCl_2$ type supported on $MgCl_2$ in spherical form and partially complexed with an electron-donor compound are described in U.S. Pat. No. 5,106,804.

The performance of these catalysts is better than that described in Japanese application No. 168408/88 but is still not such as to permit the production of polymers containing low enough catalyst residues. The quantity of Zr compound supported on $MgCl_2$ is relatively low (the Zr/Mg ratio in the catalyst is less than about 0.05).

Furthermore, the catalysts require the use of polymethylalumoxane (MAO) and are not active with Al-alkyls of the Al-triethyl type. However, the yields relative to MAO are not high.

Application EP-A-318048 describes catalysts in which a solid component comprising a Ti compound supported on a magnesium chloride that has particular characteristics of surface area and porosity and if necessary an electron-donor compound, is used with benzylic compounds of Ti or Zr or with metallocene compounds of the type $Cp_2Ti(CH_3)_2$ and bis-(indenyl)-$Zr(CH_3)_2$ to form catalysts for polymerization of ethylene and of propylene. The ratio by weight of metallocene to magnesium chloride is very high (greater than 1) so that it is necessary to remove the metallocene from the polymer that is obtained. The catalysts are used in processes carried out in the presence of a liquid polymerization medium.

Application EP-A-439964 describes bimetallic catalysts suitable for preparation of ethylene polymers with wide molecular weight distribution (Mw/Mn between 4 and 14) obtained by supporting a metallocene on a solid component containing a Ti compound supported on magnesium chloride. MAO or its mixtures with Al-alkyl are used as co-catalyst. Al-trialkyls are also used on their own, but the catalytic activity is low. The yields of these mixed catalysts in which active centres are operative, derived both from the Ti compound supported on $MgCl_2$ and from the metallocene compound, are very high when the catalysts are used in a hydrocarbon medium; on the other hand they are low when polymerization is carried out in the gas phase.

Application EP-A-522281 describes catalysts obtained from $Cp_2ZrCl_2$ supported on magnesium chloride and from mixtures of Al-trialkyl and compounds supplying stable anions of the dimethylanilino-tetrakis-(pentafluorophenyl)borate type. The catalysts are prepared by grinding the components and are used in polymerization tests in the presence of a solvent (toluene) with yields of polyethylene relative to $MgCl_2$ of the order of 9000 g/g.

Application EP-A-509944 describes catalysts using compounds of the anilino-tetrakis-(pentafluorophenyl)borate type or Lewis acids such as MgCl$_2$ together with metallocene halides pre-reacted with Al-alkyl compounds.

The magnesium chloride is ground before it is brought into contact with the pre-reacted metallocene compound. The yields of polymer relative to the Mg halide are not high. Catalyst components have now been found that are able to form catalysts with particularly high activity and that are capable of producing polymers with controlled morphological properties so that the catalysts can also be used in gas-phase processes in a fluidized bed.

The components of the invention are obtained by bringing a compound of a transition metal M selected from Ti, V, Zr and Hf containing at least one M—$\pi$ bond into contact with a prepolymer obtained by polymerization of one or more olefins CH$_2$=CHR in which R is hydrogen or an alkyl, cycloalkyl or aryl with 1–12 carbon atoms, and/or of one or more di- or polyenes, with a coordination catalyst comprising the product obtained by contacting a compound of Ti, V, Zr, Hf or mixture thereof with a Mg halide in the form of particles with average size of the crystallites below 300 Å. The polymeric support is prepared in a quantity of from 0.5 to 2000 g per g of solid component, preferably in a quantity of from 5 to 500 g per g, and more preferably in a quantity of from 10 to 100 g per g of solid component. The compound of the transition metal M includes in particular at least one ligand L coordinated on the metal M possessing a mono- or polycyclic structure containing conjugated $\pi$ electrons. Said compound of the transition metal M is preferably chosen from among compounds with the structure:

$$Cp'MR^1_aR^2_bR^3_c \qquad (I)$$

$$Cp'Cp''MR^1_aR^2_b \qquad (II)$$

$$(Cp'—A_e—Cp'')M^1R^1_aR^2_b \qquad (III)$$

in which M is Ti, V, Zr or Hf; Cp$'$ and Cp$''$, which may be identical or different from each other, are cyclopentadienyl groups which may be substituted; two or more substituents on the said cyclopentadienyl groups can form one or more rings having from 4 to 6 carbon atoms; R$^1$, R$^2$ and R$^3$, which may be identical or different, are atoms of hydrogen, halogen, an alkyl or alkoxyl group with 1–20 carbon atoms, aryl, alkaryl, or aralkyl with 6–20 carbon atoms, an acyloxy group with 1–20 carbon atoms, an allyl group, or a substituent containing a silicon atom; A is an alkenyl bridge or has a structure chosen from:

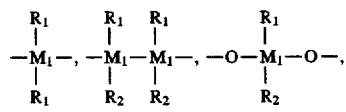

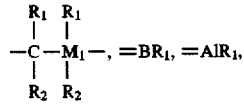

—Ge—, —Sn—, —O—, —S—, =SO, =SO$_2$, —NR$_1$, =PR$_1$, or =P(O)R$_1$, in which M$_1$ is Si, Ge, or Sn; R$_1$ and R$_2$, which may be identical or different, are alkyl groups with 1–4 carbon atoms or aryl groups with 6–10 carbon atoms; a, b, c are, independently, integers from 0 to 4; e is an integer from 1 to 6 and two or more of the radicals R$^1$, R$^2$ and R$^3$ can form a ring. In the case when the group Cp is substituted, the substituent is preferably an alkyl group with 1–20 carbon atoms.

Representative compounds possessing formula (I) include:

(Me$_5$Cp)MMe$_3$, (Me$_5$Cp)M(OMe)$_3$, (Me$_5$Cp)MCl$_3$, (Cp)MCl$_3$, (Cp)MMe$_3$, (MeCp)MMe$_3$, (Me$_3$Cp)MMe$_3$, (Me$_4$Cp)MCl$_3$, (Ind)MBenz$_3$, (H$_4$Ind)MBenz$_3$, (Cp)MBu$_3$.

Representative compounds possessing formula (II) include:

(Cp)$_2$MMe$_2$, (Cp)$_2$MPh$_2$, (Cp)$_2$MEt$_2$, (Cp)$_2$MCl$_2$, (Cp)$_2$M(OMe)$_2$, (Cp)$_2$M(OMe)Cl, (MeCp)$_2$MCl$_2$, (Me$_5$Cp)$_2$MCl$_2$, (Me$_5$Cp)$_2$MMe$_2$, (Me$_5$Cp)$_2$MMeCl, (Cp)(Me$_5$Cp)MCl$_2$, (1-MeFlu)$_2$MCl$_2$, (BuCp)$_2$MCl$_2$, (Me$_3$Cp)$_2$MCl$_2$, (Me$_4$Cp)$_2$MCl$_2$, (Me$_5$Cp)$_2$M(OMe)$_2$, (Me$_5$Cp)$_2$M(OH)Cl, (Me$_5$Cp)$_2$M(OH)$_2$, (Me$_5$Cp)$_2$M(C$_6$H$_5$)$_2$, (Me$_5$Cp)$_2$M(CH$_3$)Cl, (EtMe$_4$Cp)$_2$MCl$_2$, [(C$_6$H$_5$)Me$_4$Cp]$_2$MCl$_2$, (Et$_5$Cp)$_2$MCl$_2$, (Me$_5$Cp)$_2$M(C$_6$H$_5$)Cl, (Ind)$_2$MCl$_2$, (Ind)$_2$MMe$_2$, (H$_4$Ind)$_2$MCl$_2$, (H$_4$Ind)$_2$MMe$_2$, {[Si(CH$_3$)$_3$]Cp}$_2$MCl$_2$, {[Si(CH$_3$)$_3$]$_2$Cp}$_2$MCl$_2$, (Me$_4$Cp)(Me$_5$Cp)MCl$_2$.

Representative compounds possessing formula (III) include:

C$_2$H$_4$(Ind)$_2$MCl$_2$, C$_2$H$_4$(Ind)$_2$MMe$_2$, C$_2$H$_4$(H$_4$Ind)$_2$MCl$_2$, C$_2$H$_4$(H$_4$Ind)$_2$MMe$_2$, Me$_2$Si(Me$_4$Cp)$_2$MCl$_2$, Me$_2$S(Me$_4$Cp)$_2$MMe$_2$, Me$_2$SiCp$_2$MCl$_2$, Me$_2$SiCp$_2$, MMe$_2$, Me$_2$Si(Me$_4$Cp)$_2$MMeOMe, Me$_2$Si(Flu)$_2$MCl$_2$, Me$_2$Si(2-Et-5-iPrCp)$_2$MCl$_2$, Me$_2$Si(H$_4$Ind)$_2$MCl$_2$, Me$_2$Si(H$_4$Flu)$_2$MCl$_2$, Me$_2$SiCH$_2$(Ind)$_2$MCl$_2$, Me$_2$Si(2-Me-H$_4$Ind)$_2$MCl$_2$, Me$_2$Si(2-MeInd)$_2$MCl$_2$, Me$_2$Si(2-Et-5-iPr-Cp)$_2$MCl$_2$, Me$_2$Si(2-Me-5-EtCp)$_2$MCl$_2$, Me$_2$Si(2-Me-5-Me-Cp)$_2$MCl$_2$, Me$_2$Si(2-Me-4,5-benzoindenyl)$_2$MCl$_2$, Me$_2$Si(2-EtInd)$_2$MCl$_2$, Me$_2$Si(4,5-benzoindenyl)$_2$MCl$_2$, Me$_2$Si(2-t-butyl-Ind)MCl$_2$, Me$_2$Si(2-iPr-Ind)$_2$MCl$_2$, Me$_2$Si(3-t-butyl-5-MeCp)$_2$MCl$_2$, Me$_2$Si(3-t-butyl-5-MeCp)$_2$MMe$_2$, Me$_2$Si(2-MeInd)$_2$MCl$_2$, C$_2$H$_4$(2-Me-4,5-benzindenyl)$_2$MCl$_2$, Me$_2$C(Flu)CpMCl$_2$, Ph$_2$Si(Ind)$_2$MCl$_2$, Ph(Me)Si(Ind)$_2$MCl$_2$, C$_2$H$_4$(H$_4$Ind)M(NMe$_2$)OMe, isopropylidene-(3-t-butylCp)(Flu)MCl$_2$, Me$_2$C(Me$_4$Cp)(MeCp)MCl$_2$ MeSi(Ind)$_2$MCl$_2$, Me$_2$Si(Ind)$_2$MMe$_2$, Me$_2$Si(Me$_4$Cp)$_2$MCl(OEt), C$_2$H$_4$(Ind)$_2$M(NMe$_2$)$_2$, C$_2$H$_4$(Me$_4$Cp)$_2$MCl$_2$, C$_2$Me$_4$(Ind)$_2$MCl$_2$, Me$_2$Si(3-Me-Ind)$_2$MCl$_2$, C$_2$H$_4$(2-Me-Ind)$_2$MCl$_2$, C$_2$H$_4$(3-Me-Ind)$_2$MCl$_2$, C$_2$H$_4$(4,7-Me$_2$-Ind)$_2$MCl$_2$, C$_2$H$_4$(5,6-Me$_2$-Ind)$_2$MCl$_2$, C$_2$H$_4$(2,4,7-Me$_3$Ind)$_2$MCl$_2$, C$_2$H$_4$(3,4,7-Me$_3$Ind)$_2$MCl$_2$, C$_2$H$_4$(2-Me-H$_4$Ind)$_2$MCl$_2$, C$_2$H$_4$(4,7-Me$_2$-H$_4$Ind)$_2$MCl$_2$, C$_2$H$_4$(2,4,7-Me$_3$-H$_4$Ind)$_2$MCl$_2$, Me$_2$Si(4,7-Me$_2$-Ind)$_2$MCl$_2$, Me$_2$Si(5,6-Me$_2$-Ind)$_2$MCl$_2$, Me$_2$Si(2,4,7-Me$_3$-H$_4$Ind)$_2$MCl$_2$.

In the simplified formulae given above, the symbols have the following meanings:

Me=methyl, Et=ethyl, iPr=isopropyl, Bu=butyl, Ph=phenyl, Cp=cyclopentadienyl, Ind=indenyl, H$_4$Ind=4,5,6,7-tetrahydroindenyl, Flu=fluorenyl, Benz=benzyl, M=Ti, Zr or Hf, preferably Zr.

Compounds of the type Me$_2$Si(2-Me-Ind)$_2$ZrCl$_2$ and Me$_2$Si(2-Me-H$_4$Ind)ZrCl$_2$ and their methods of preparation are described in European applications EP-A-485822 and 485820 respectively, the descriptions of which are included here by reference.

Compounds of the type Me$_2$Si(3-t-butyl-5-MeCp)$_2$ZrCl$_2$ and of the type Me$_2$Si(2-Me-4,5-benzoindenyl)ZrCl$_2$ and their method of preparation are described in U.S. Pat. No.

5,132,262 and in patent application EP-A-549900 respectively, the descriptions of which are included here by reference.

The catalysts used for preparation of the prepolymer preferably comprise the product obtained by contacting a halide of Ti, V, Zr, Hf or mixture thereof, especially a chloride or a halogen-alcoholate of Ti or V, with a Mg chloride having average size of the crystallites below 300 Å and preferably below 150 Å and more preferably in the range from about 30 to 120 Å. The chlorides and the halogen-alcoholates of Ti or V preferably include $TiCl_4$, $TiCl_3$, chloro-alcoholates of Ti such as $Ti(OBu)_2Cl_2$ and $Ti(OBu)Cl_3$, $VCl_3$, $VOCl_3$.

Examples of catalysts of this type are described in patents U.S. Pat. No. 4,495,338, U.S. Pat. No. 4,298,718 and U.S. Pat. No. 4,542,198, the descriptions of which are included here by reference. Other examples of catalysts comprising the product obtained by contacting one or more compounds of Ti, V, Zr or Hf with a magnesium halide having the above specified features are given in Italian Patent Applications MI-94-A-001065 and MI-94-A-001421. Preferably, the solid components of the catalysts are used in spherical form with particle size from approx. 5 to 100 microns and with surface area greater than 200 $m^2$/g (BET) and porosity (nitrogen method) greater than 0.3 cc/g or with surface area (BET) less than 200 $m^2$/g and porosity (mercury method) between about 0.5 cc/g and 2 cc/g.

Examples of catalysts comprising components of this type and the method of preparation of the components are described in patents U.S. Pat. No. 4,399,054, EP-A-395083, EP-A-553805 and EP-A-553806, the descriptions of which are included here by reference. The content of titanium or vanadium in the said catalytic components is preferably greater than 1% by weight and preferably between 2 and 10% by weight.

The catalysts preferably use as Al-alkyl compound, an Al-trialkyl such as $AlEt_3$, Al-triisobutyl, Al-tri-n-butyl, and their mixtures with Al-dialkyl halides. Alumoxane compounds can also be used. The olefins used in preparation of the prepolymer include ethylene, propylene, 1-butene, 4-methyl-1-pentene, 1-hexene, 1-octene and their mixtures.

Preferably the prepolymer is made up of polyethylene, copolymers of ethylene with proportions less than 20 mol. % of an olefin selected from propylene, 1-butene, 1-hexene, 4-methyl-1-pentene, 1-octene, cyclopentene, cyclohexene; polypropylene with isotacticity index above 80%; crystalline copolymers of propylene with smaller amounts (5 mol. % or less) of ethylene and/or α-olefins such as 1-butene, 1-hexene. Prepolymers from dienes or conjugated polyenes can also be used.

Prepolymerization is preferably carried out in liquid phase consisting of an inert hydrocarbon solvent such as propane, hexane, heptane, isobutane or of a monomer, or in gas phase working at temperatures generally below 100° C., and preferably between 20° C. and 70° C.

The prepolymer is produced in a quantity greater than about 0.5 g per g of component and up to about 2000 g/g. Preferably the amount is between 5 and 500 g per g of solid component, and more preferably between 10 and 100 g per gram of solid component. The porosity of the prepolymer, determined with the mercury method described hereinafter, is preferably greater than 0.3 $cm^3$/g, more preferably greater than 0.4 $cm^3$/g and expecially greater than 0.5 $cm^3$/g. The above given porosity values refer to pores having radius up to 50,000 Å.

The quantity of magnesium halide present in the prepolymer, expressed as Mg, is generally between 50 and 50000 ppm, preferably between 100 and 20000 ppm, and more preferably between 300 and 10000 ppm.

The atomic ratio of the transition metal M containing at least one π bond with the magnesium of the halide, in particular the Zr/Mg ratio (relative to the Zr compound present in the prepolymer such as cannot be extracted with toluene: 3 washings at a concentration of 100 g/liter at 20° C.) is greater than 0.1, in particular greater than 0.2 and preferably between 0.3 and 3.

Transition metal/magnesium atomic ratios above 0.1 have never before been accomplished in the components comprising an Mg halide and a metallocene compound of Zr, Ti, V or Hf. Catalytic components comprising a prepolymer containing dispersed fine particles of Mg halide and which contain, in a form at least partly combined with the Mg halide, a compound of a transition metal M chosen from among Ti, V, Zr or Hf containing at least one M—π bond, in an atomic ratio M/Mg greater than 0.1, have not been described previously in the literature. The reaction of the prepolymer containing the solid component of the prepolymerization catalyst with the transition metal compound is preferably carried out an inert hydrocarbon medium in which the metallocene compound is soluble (toluene, benzene and similar hydrocarbons), working at temperatures between −40° C. and the melting point of the prepolymer, preferably between 0° and 100° C., and more preferably between 10° and 70° C.

The reaction between the prepolymer and the transition metal compound containing at least one π bond can if necessary be effected in the presence of an electron-donor compound in such a way as to fix a quantity of electron-donor compound between 0.1 and 15 wt. % of the total.

The solubility of the metallocene compound containing at least one M—π bond increases when the said compound is dissolved in toluene and similar hydrocarbons also containing dissolved therein Al-alkyl compound such as Al-triethyl, Al-triisobutyl or a polyalkylalumoxane, and in particular MAO or its mixtures with an Al-alkyl compound, using molar ratios of Al-alkyl compound/metallocene compound greater than 2, preferably between 5 and 100. The solutions that are obtained are particularly suitable as components of catalyst having very high activity. Such activity is greater than the activity that can be obtained when using solutions of the metallocene compound that have been obtained in the absence of the Al compound mentioned above.

The components of the invention form, with Al-alkyl compounds or with polyalkylalumoxane compounds or their mixtures, catalysts that have very high activity relative to the Mg halide, by far greater than that of the catalysts containing Mg halide known up to now.

The Al-alkyl compound is generally selected from among compounds of formula $AlR_3$, in which R is an alkyl with 1–12 carbon atoms, and the alumoxane compounds containing the repeating unit —($R^4$)AlO—, in which $R^4$ is an alkyl radical containing from 1 to 6 carbon atoms, and said alumoxane compounds contain from 2 to 50 repeating units possessing the formula described above. Typical examples of compounds with the formula $AlR_3$ are Al-trimethyl, Al-triethyl, Al-triisobutyl, Al-tri-n-butyl, Al-trihexyl and Al-trioctyl. Among the alumoxane compounds, use of MAO is preferred. Mixtures of Al-alkyl compounds, preferably Al-triisobutyl, and alumoxane compounds, preferably MAO, are also used advantageously.

When the transition metal compound containing at least one M—π bond is of the type described in formulae (II) and (III), the compounds obtained from reaction between $AlR_3$ and $H_2O$ in molar ratios between 0.01 and 0.5 can be used advantageously.

Figure 2:
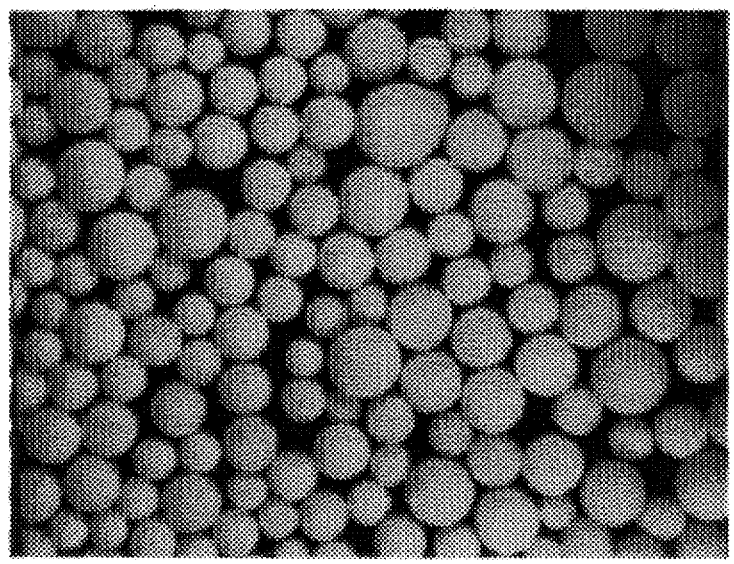

Activities of at least 100 kg/g of MgCl$_2$ and which can even be greater than 1000 kg/g of MgCl$_2$ can normally be obtained even in gas-phase polymerization processes. Using prepolymers obtained with catalysts whose components are in the form of spherical particles, it is possible to obtain polymers which replicate the morphology of the catalyst component and hence conduct processes in the gas phase in a fluidized bed in an easily controllable manner, avoiding difficulties such as local overheating of the bed, problems with heat exchange etc., which make it difficult to conduct processes in the gas phase. FIG. 1 shows a photograph of the catalyst reproduced at 12-times magnification; FIG. 2 shows a photograph of the polymer obtained by polymerization in the gas phase, reproduced at 3.5 times magnification.

Moreover, it is possible, using prepolymers obtained with catalysts whose components are in the form of spherical particles that have high macroporosity (e.g. Hg porosity greater than 1 cc/g), to produce in the gas-phase polymers and copolymers of a rubbery nature, which normally tend to agglomerate and create problems in conducting the gas-phase process.

The catalysts of the invention can be used for (co) polymerization of olefins CH$_2$=CHR, where R is hydrogen or an alkyl radical with 1–10 carbon atoms or an aryl. They are used in particular for polymerization of ethylene and its mixtures with alpha olefins of the type indicated above, in which R is an alkyl radical.

The catalysts, especially those obtained from compounds of the type C$_2$H$_4$(Ind)$_2$ZrCl$_2$, C$_2$H$_4$(H$_4$Ind)ZrCl$_2$ and Me$_2$Si (Me$_4$Cp)$_2$ZrCl$_2$ are suitable for producing LLPDE (copolymers of ethylene containing smaller proportions, generally less than 20 mol. %, of C$_3$–C$_{12}$ alpha olefin) characterized by relatively low density values relative to the content of alpha olefin, with reduced solubility in xylene at room temperature (below approx. 10 wt. %) and with molecular weight distribution Mw/Mn between about 2.5 and 5. For a density of 0.912 the content of α-olefin is equal to about 5 mol. %. For a density of 0.906 the content of α-olefin is equal to about 7 mol. %.

The Mw/Mn values are generally higher than those obtainable with the metallocene catalysts known hitherto, whether used in solution or supported, and endow the polymer with characteristics of processability that are superior to those of polymers that have a narrower molecular weight distribution.

The polypropylenes that can be obtained with catalysts that use a chiral metallocene compound are characterized by high stereoregularity, with high molecular weights that are easily controllable and with high crystallinity.

The chiral metallocene compounds that can be used are, for example, of the type described in European application EP-A-485823, EP-A-485820, EP-A-519237, and U.S. Pat. Nos. 5,132,262, and 5,162,278.

The following examples are given to illustrate the invention and are non-restricting. The properties stated were determined according to the following methods:

POROSITY AND SURFACE AREA WITH NITROGEN:
determined according to the B.E.T. methodology (apparatus used: SORPTOMATIC 1800 from Carlo Erba).

POROSITY AND SURFACE AREA WITH MERCURY:
determined by immersing a known quantity of the sample in a known quantity of mercury inside a dilatometer and then gradually increasing the mercury pressure hydraulically. The pressure of penetration of mercury into the pores is a function of their diameter. Measurement is effected using a "Porosimeter 2000 series" porosimeter from Carlo Erba. The porosity, pore distribution and surface area are calculated from the data for the decrease of volume of the mercury and from the values of the applied pressure.

PARTICLE SIZE OF THE CATALYST:
determined with a method based on the principle of optical diffraction of monochromatic laser light with the "Malvern Instr. 2600" apparatus. The mean size is stated as P50.

MIE FLOW INDEX:
ASTM-D 1238, condition E

MIF FLOW INDEX:
ASTM-D 1238, condition F

FLOWABILITY:
is the time taken by 100 g of polymer to flow through a funnel whose outlet has a diameter of 1.25 cm and whose walls are inclined 20° from the vertical.

APPARENT DENSITY:
DIN-53194

MORPHOLOGY AND GRANULOMETRIC DISTRIBUTION OF THE POLYMER PARTICLES:
ASTM-D 1921-63

FRACTION SOLUBLE IN XYLENE:
determined at 25° C.

CONTENT OF COMONOMER:
percentage by weight of comonomer determined from IR spectrum.

ACTUAL DENSITY:
ASTM-D 792

MEAN SIZE OF CRYSTALLITES D(110):
determined by measuring the width at half-height of the (110) diffraction line that appears in the X-ray spectrum of the magnesium halide, applying Scherrer's equation:

$$D(110)=(K \cdot 1.542 \cdot 57.3)/(B-b)\cos\theta,$$

where:
K=constant (1.83 in the case of magnesium chloride);
B=width at half-height (in degrees) of the (110) diffraction line;
b=instrumental broadening;
θ=Bragg angle.

In the case of magnesium chloride, the (110) diffraction line appears at an angle 2θ of 50.2°.

EXAMPLES

In the examples the percentages are by weight. The term catalyst denotes the component obtained by bringing the transition metal compound into contact with the prepolymer. The term support denotes the prepolymer used in preparation of the catalyst. The intrinsic viscosity is expressed in dl/g.

EXAMPLE 1

Preparation of the support 10 liters of hexane were loaded into a glass autoclave equipped with anchor stirrer and baffles, with capacity of 25 liters and treated with N$_2$ at 90° C. for 3 hours. 290 g of catalyst prepared according to the method described in example 3 of patent EP-A-553806 and with an average diameter of 30 μm were added, while stirring at 20° C. Then 2.0 liters of a solution of Al-triisobutyl (TIBAL) in hexane (100 gl) were introduced in 15 minutes at 20° C. and stirring was continued for 15 minutes. Ethylene was supplied at a partial pressure of 100 mm Hg at 35° C. and polymerization was effected until a yield equal to 40 g of polymer per gram of solid catalyst component was obtained. Three washings were effected in hexane 100 g/liter at 20° C. After drying, 11.6 kg of spherical prepolymer was obtained, with the following characteristics:

Surface area=1.6 m$^2$/g (Hg);

Porosity=0.702 cm$^3$/g (Hg; referred to pores with radius up to 50.000 Å);

P50=131.33 µm;

Ti=0.2%; Cl=1.1%; Mg=0.26%; Al0.05%.

Preparation of the metallocene/polymethylalumoxane solution

A 1000 cm$^3$ reactor, equipped with anchor stirrer and treated with N$_2$, was loaded with 600 cm$^3$ of toluene, 47.4 g of polymethylalumoxane (MAO) and 8.46 g of ethylene-bis-(indenyl)-zirconium dichloride (EBI). The system was stirred continuously in N$_2$ atmosphere at 20° C. for 3 hour. At the end of this period a clear solution was obtained.

Preparation of the catalyst

A 1000 cm$^3$ reactor, equipped with anchor stirrer and treated with N$_2$ at 90° C. for 3 hours, was loaded, in nitrogen atmosphere at 20° C., with 300 cm$^3$ of toluene, and 100 g of the support previously prepared. 200 cm$^3$ of the previously prepared metallocene/MAO solution was introduced in 10 minutes at 20° C. while stirring. The system was brought up to 40° C. and maintained at that temperature for 4 hours and then the solvent was removed by vacuum evaporation at a maximum temperature of about 40° C. for about 3 hours. 118.62 g of spherical catalyst was obtained, with the following characteristics:

Zr=0.5%; Mg=0.26%; Cl=1.28%; Al=5.2%.

Polymerization (HDPE)

In a glass flask treated with N$_2$ at 90° C. for 3 hours, 0.42 g of MAO and 0.05 g of the catalyst described above were pre-contacted in 100 cm$^3$ of toluene, for 5 minutes at 30° C.

Then the whole was fed into a 4-liter steel autoclave, equipped with anchor stirrer and treated with N$_2$ at 90° C. for 3 hours, containing 1.6 liters of hexane at approx. 20° C. The autoclave was raised to 75° C. and 7 bar of ethylene and 0.1 bar of hydrogen were supplied. Polymerization was effected for one hour, keeping the temperature and ethylene pressure constant.

Polymerization was discontinued by instantaneous degassing of the autoclave and, after cooling to 20° C., the slurry of polymer was discharged and dried in oven at 80° C. in nitrogen. 325 g of polyethylene in the form of spherical particles was obtained (yield 6500 g polyethylene/g cat; 1300 kg/g Zr; 640 kg/g MgCl$_2$), with the following characteristics:

MIE=0.8; F/E=62; η=1.1; Mw/Mn=3,4

EXAMPLE 2

Polymerization (LLDPE)

In a glass flask treated with N$_2$ at 90° C. for 3 hours, 0.42 g. of MAO and 0.05 g of the catalyst from example 1 were pre-contacted in 100 cm$^3$ of toluene, for 5 minutes at 20° C.

Then the whole was fed into a 4-liter steel autoclave, equipped with anchor stirrer and treated in N$_2$ at 90° C. for three hours, containing 800 g of propane at 30° C. The autoclave was heated to 75° C. and 0.1 bar of H$_2$ was supplied, and then, simultaneously 7 bar of ethylene, and 100 g of 1-butene. Polymerization was effected for 1 hour, keeping the temperature and the ethylene pressure constant.

125 g of ethylene-butene copolymer in the form of spherical particles was obtained (yield 2500 of copolymer/g cat; 500 kg/g Zr; 245 kg/g MgCl$_2$) with the following characteristics:

MIE=8.4; F/E=19; η=1; actual density=0.912; bound butene=11%; insolubles in xylene=94%; Mw/Mn=2.8.

EXAMPLE 3

Polymerization (LLPDE)

0.05 g of the catalyst of example 1 was pre-contacted under the same conditions as in example 2 using 1.4 g of TIBAL instead of 0.42 of MAO. Then ethylene and butene were copolymerized in the same conditions as in example 2. 75 g of ethylene-butene copolymer was obtained (yield 1500 g copolymer/g catalyst), with the following characteristics:

MIE=3; F/E=35.3; η=1.1; actual density=0.912; insolubles in xylene=90%.

EXAMPLE 4

Preparation of the support

Same procedure as in example 1.

Preparation of the metallocene/MAO solution

The conditions were the same as in example 1 but with the following quantities of reactants: 300 cm$^3$ toluene; 43.26 g of MAO; 19.58 g of EBI.

Preparation of the catalyst

The conditions were the same as in example 1, but with 100 cm$^3$ of the metallocene/MAO solution. Approx. 118 g of spherical catalyst was obtained, with the following characteristics:

Zr=0.77%; Mg=0.17%; Cl=1.35%; Al=3.95%.

Polymerization

The polymerization conditions were identical to example 2 but instead of 0.1 bar of H$_2$ and 100 g of butene, 0.5 bar of H$_2$ and 150 g of butene were used. 350 g of ethylene-butene copolymer in the form of spherical particles was obtained (yield 7000 g copolymer/g cat; 1000 kg/g Zr; 1050 kg/g MgCl$_2$) with the following characteristics:

MIE=5.9; F/E=41; η=0.8; actual density=0.906; bound butene=15%; insolubles in xylene=88%.

EXAMPLE 5

In this example a metallocene/TIBAL solution was used in preparation of the catalyst.

Preparation of the support

Same procedure as in example 1.

Preparation of the metallocene/TIBAL solution

A 500 cm$^3$ reactor, equipped with anchor stirrer and treated with N$_2$ at 90° C. for 3 hours, was supplied with 382.5 cm$^3$ of a hexane solution of TIBAL (100 g/liter) and 14.25 g of EBI in N$_2$ atmosphere, at 20° C. for 60 minutes. At the end of this time, a clear solution was obtained.

Preparation of the catalyst

The same reactor was used at the same temperature as in example 1, but with 110 cm$^3$ of the metallocene/TIBAL solution, the reaction being conducted for 3 hours instead of 4 hours. 117.5 g of spherical catalyst was obtained, with the following characteristics:

Zr=0.7; Mg=0.14%; Cl=1.54%; Al=1.4%.

Polymerization

The procedure was the same as in example 1, but instead of using 0.1 bar of $H_2$, 0.5 bar of $H_2$ is used. 175 g of spherical form polyethylene was obtained (yield 3500 g of polyethylene/g cat; 470 kg/g Zr; 640 kg/g $MgCl_2$), with the following characteristics:

MIE=17; F/E=31; η=0.9.

EXAMPLE 6

Polymerization

Using the catalyst of example 5, polymerization was effected according to the procedure of example 2 but with the following changes: the catalyst prepared according to the procedure in example 5 was pre-contacted with 1.45 g of TIBAL instead of 0.42 g of MAO; in the autoclave the $H_2$ pressure was 1 bar instead of 0.1, and 200 g of butene was loaded instead of 100 grams. 35 g of spherical form ethylene-butene copolymer was obtained (yield 700 g copolymer/g cat; 127 kg/g $MgCl_2$, with the following characteristics:

MIE=14; FIE=33; actual density=0.909; bound butene=13%; insolubles in xylene=74%.

EXAMPLE 7

Preparation of the support

The support was prepared according to the procedure and conditions in example 1.

Preparation of the metallocene/TIBAL solution

The procedure in example 5 was followed.

Preparation of the catalyst

Preparation was effected with the same procedure as in example 5 but using 127.5 cm³ of the metallocene/TIBAL solution instead of 110 cm³ and conducting the reaction for 4 hours instead of 3 hours. 117.5 g of spherical catalyst was obtained with the following characteristics:

Zr=1.02%; Mg=0.16%; Al=1.61%.

Polymerization

The conditions used were the same as in example 1, using the catalyst prepared in the manner described previously. 280 g of spherical form polyethylene was obtained (yield 5600 g polyethylene/g cat) with the following characteristics:

η=1.3; MIE=0.5; F/E=70; Mw/Mn=3.4

EXAMPLE 8

Preparation of the catalyst

The catalyst was prepared according to the procedure and conditions of example 7.

Polymerization

The procedure of example 2 was followed but using 50 g of butene instead of 100 g and employing the catalyst prepared according to the procedure described above. 220 g of spherical form ethylene-butene copolymer was obtained (yield copolymer/cat=4400) with the following characteristics:

MIE=5; F/E=31.8; η=1.17; insolubles in xylene=97.4; actual density=0.920; $C_4$ bound=3.9%

EXAMPLE 9

Preparation of the support

The procedure in example 1 was followed.

Preparation of the metallocene/MAO solution

The procedure in example 1 was followed.

Preparation of the catalyst

The catalyst prepared as in example 1 was washed 3 times with toluene (100 g/liter) at approx. 20° C. The solvent was eliminated under vacuum at a maximum temperature of 40° C.

The obtained spherical catalyst had the following characteristics: Zr=0.45%; Mg=0.26%; Cl=1.22%; Al=2.9%.

Polymerization

Polymerization was conducted in the same conditions as in example 1. 112.5 g of spherical form polyethylene was obtained (yield 2250 g polyethylene/g cat) with the following characteristics:

MIE=0.9; FIE=58; η=1.43.

EXAMPLE 10

Preparation of the support

The support was prepared according to the method described in example 1.

Preparation of the catalyst

A 1000 cm³ reactor, equipped with anchor stirrer and treated with $N_2$ at 90° C. for 3 hours, was loaded with 500 cm³ of toluene and 6 g of MAO and 50 g of support in $N_2$ atmosphere, at 20° C. while stirring.

Then the system was heated to 80° C. for 2 hours, after which the solvent was removed by evaporation at 20 mm Hg. The solid obtained was suspended in 500 cm³ of toluene and 1.2 g of EBI was supplied at 20° C. while stirring. The system was kept in $N_2$ atmosphere at 20° C. for 6 hours.

Then the solvent was removed by vacuum evaporation at 40° C., obtaining 57.2 g of catalyst with the following characteristics:

Zr=0.4%; Mg=0.26%; Cl=1.37%; Al=5.2%.

Polymerization

Using the catalyst prepared according to the procedure described above, polymerization was effected in the same conditions as in example 1. 100 g of polyethylene was obtained in the form of spherical particles (yield 2000 g PE/g catalyst) with the following characteristics:

MIE=0.5; F/E=78; η=1.6.

EXAMPLE 11

Preparation of the support

The support was prepared according to the method in example 1.

Preparation of the catalyst

A 3000 cm$^3$ reactor, equipped with anchor stirrer and baffles, previously treated with $N_2$ at 90° C. for 3 hours, was supplied at 20° C., while stirring, in $N_2$ atmosphere, with 20 g of support, 2000 cm$^3$ of toluene, and 0.914 g of EBI. The mixture was caused to react at 40° C. for 20 hours. At the end of this time the solvent was removed by evaporation at a pressure of 20 mm Hg, obtaining about 21 g of spherical catalyst with the following characteristics:

Zr=0.98%; Mg=0.27%.

Polymerization

Using the catalyst prepared according to the method and conditions stated above, polymerization was effected as in example 1. 160 g of spherical form polyethylene was obtained (yield 3200 g polyethylene/g cat), with the following characteristics:

MIE=2.96; F/E=40.5; η=1.12.

EXAMPLE 12

Preparation of the support

Preparation was effected similarly to example 1 but instead of supplying ethylene until a yield of 40 g of polymer per g of catalyst was obtained, the reaction was conducted in such a way as to obtain a yield of 10 g of polymer per gram of catalyst. 2.9 kg of spherical prepolymer was obtained, with the following characteristics:

Surface area=2.6 m$^2$/g;

Porosity=1.215 cm$^3$/g;

P50=79.49 µm;

Ti=0.8%; Cl=4.45%; Mg=1.05%; Al=0.18%.

Preparation of the metallocene/MAO solution

The method and conditions of example 1 were followed.

Preparation of catalyst

Following the procedure in example 1 and using the support described previously, 118.2 g of spherical catalyst was obtained with the following characteristics:

Zr=0.44%; Cl=4.16%; Mg=0.95%; Al=5.09%; Ti=0.78%.

Polymerization

Polymerization was effected as in example 1, using the catalyst described above. 105 g of spherical form polyethylene was obtained (yield 2100 g polyethylene/g cat), with the following characteristics:

MIE=0.48; F/E=70.

EXAMPLE 13

Preparation of the support

The procedure as in example 1 was followed, but instead of loading 290 g of catalyst, 96.6 g was loaded, and ethylene was supplied until conversion polyethylene/cat=100 by weight was obtained. 9.6 kg of spherical prepolymer was discharged, with the following characteristics:

Surface area=0.9 m$^2$/g (for Hg);

Porosity=0.618 cm$^3$/g (for Hg);

P50=192.68 µm.

Preparation of the metallocene/MAO solution

The procedure in example 1 was followed.

Preparation of the catalyst

Following the procedure in example 1 and using the support described previously, 118.2 g of spherical catalyst was obtained, with the following characteristics:

Zr=0.41%; Cl=0.66%; Mg=0.072%; Al=4.95%.

Polymerization

Polymerization was effected as in example 1, using the catalyst described above. 35 g of spherical form polyethylene was obtained at a yield equal to 700 g polyethylene/g catalyst and with η equal to 1.15.

EXAMPLE 14

Preparation of the support

The procedure was the same as in example 1 but instead of loading 290 g of catalyst, 48 g was loaded, and ethylene was supplied until a degree of conversion polyethylene/cat= 300 by weight was obtained. 14.4 kg of spherical prepolymer with the following characteristics was discharged:

Surface area=7 m$^2$/g;

Porosity=0.499 cm$^3$/g;

P50=392.29 µm.

Preparation of the metallocene/MAO solution

The solution was prepared according to the method in example 1.

Preparation of catalyst

The procedure was as in example 1, using the support described above. 18.2 g of spherical catalyst was obtained with the following characteristics:

Zr=0.55%; Cl=0.54%; Mg=0.02%; Al=6.40%.

Polymerization

Polymerization was effected as in example 1 and 35 g of spherical form polyethylene was obtained with a yield equal to 700 g polyethylene/g of catalyst. The polymer had the following characteristics:

MIE=12.6; FIE=23.9; η=0.95.

EXAMPLE 15

Polymerization

In a glass flask treated with $N_2$ at 90° C. for 3 hours, 0.216 g of catalyst prepared according to the method in example 1 and 6 g of TIBAL were pre-contacted in 50 cm$^3$ of hexane for 5 minutes at 20° C. At the end of this time, the whole was fed into a fluidized-bed gas-phase reactor with a volume of 35 liters, in which 7 bar of ethylene and 8 bar of propane were present at a temperature of 75° C. The reaction was conducted in the gas phase for three hours, keeping the temperature and ethylene pressure constant.

At the end it was degassed and 520 grams of spherical polyethylene were discharged, at yield of 2400 g polyethylene/g catalyst. The bulk density of the polymer was 0.36 g/cm$^3$ and the flowability 18 sec.

EXAMPLE 16

Preparation of the support 210 g of a catalyst prepared according to the procedure of Example 1 of U.S. Pat. No. 4,220,554 was polymerized under the same condition given in Example 1 (preparation of the support). 8.4 Kg of a prepolymer in granular form was obtained, having the following characteristics:

Surface area (Hg)=1 m$^2$/g; porosity (Hg, referred to pores with radius up to 50,000 Å)=0.159 cm$^3$/g Preparation of the catalyst Preparation was carried out under the same conditions of Example 1 but using 70.9 cm$^3$ of metallocene/MAO solution instead of 200 cm$^3$. About 106 g of granular catalyst was obtained with the following characteristics:

Zr=0.1%; Ti=0.05%; Cl=1.28%; Mg=0.38%; Al=1.85%

Polymerization (HDPE)

The above described catalyst was polymerized as described in Example 1. 25 g of spherical form polyethylene was obtained (yield 484 g polyethylene/g cat; 484 Kg/g Zr), with the following characteristics:

η=4.2

EXAMPLE 17

Preparation of the support

Same procedures as in example 1.

Preparation of the metallocene/TIBAL solution

Preparation was carried out as in example 5 but using 14 g of bis-(4,7-dimethylindenyl)-zirconium dichloride (BDMI) and 328.8 cm$^3$ of a hexane solution of TIBAL (100 g/l).

Preparation of the catalyst

Using the above described support and metallocene/TIBAL solution, preparation was carried out as in example 1, with the difference that 176.7 cm$^3$ of metallocene/TIBAL solution was used. About 110 g of spherical form catalyst was obtained, with the following characteristics: Cl=1.26%; Mg=0.24%; Ti=0.16%; Al=0.62%; Zr=0.35%

Polymerization

The above described catalyst was polymerized as in example 2, using 50 g of 1-butene instead of 100 g. 185 g of an ethylene-butene copolymer was obtained (yield 3700 g copolymer/g cat; 1060 Kg/g Zr), with the following characteristics:

MIE=0.45; F/E=24; η=2.18; bound butene=4.2%; actual density=0.9258; insolubles in xylene=99.3%.

EXAMPLE 18

Preparation of the support

Same procedure as in example 1.

Preparation of the metallocene/TIBAL solution

Preparation was carried out as in example 5, but using 15 g of ethylen-bis(4,7-dimethyl indenyl)-zirconium dichloride (EBDMI) and 332cm$^3$ of a hexane solution of TIBAL (100 g/l).

Preparation of the catalyst

Using the above described support and metallocene/TIBAL solution, preparation was carried out as in example 1, with the difference that 287.3 cm$^3$ of metallocene/TIBAL solution was used. About 116 g of spherical form catalyst was obtained, with the following characteristics:

Cl=1.55%; Mg=0.75%; Ti=0.2%; Al=4.05%; Zr=0.75%

Polymerization

The above described catalyst was polymerized as in example 1. 225.9 g of spherical form polyethylene was obtained (yield 4518 g polyethylene/g cat.; 602 g/g Zr), with the following characteristics:

MIE=2.55; F/E=39.21

EXAMPLE 19

0.05 g of catalyst of example 18 was precontacted with 0.5 g of TIBAL at 20° C. for 5 minutes and then fed to a 4 liters stainless steel autoclave which contained 800 g of propane at 20° C. Ethylene was the fed at 40° C. until 5 g of monomer was absorbed. 0.5 g of modified-MAO (20% solution in Isopar C) was fed and the temperature raised to 75° C. Polymerization was carried out under an ethylene partial pressure of 7 bar for 1 hour. 395 g of spherical form polyethylene was obtained (yield 7452 g polyethylene/g cat.; 1552 Kg/g Zr) which had a bulk density of 0.3 g/cm$^3$.

EXAMPLE 20

Preparation of the support

Same procedure as in example 1.

Preparation of the metallocene/MAO solution

Preparation was carried out as in example 1, but using 9 g of ethylen-bis(4,5,6,7-tetrahydroindenyl)-zirconium dichloride (EBTHI) and 49.24 g of MAO.

Preparation of the catalyst

Using the above described support and metallocene/MAO solution, preparation was carried out as in example 1, with the difference that 170 cm$^3$ of metallocene/MAO solution was used. About 115 g of spherical form catalyst was obtained, with the following characteristics:

Cl=1.26%; Al=4.2%; Mg=0.28%; Ti=0.16%; Zr=0.33%

Polymerization

The above described catalyst was polymerized as in example 1. 125 g of spherical form polyethylene was obtained (yield 2520 g polyethylene/g cat.; 763 Kg/g Zr), with the following characteristics:

MIE=68.6; η=0.79

EXAMPLE 21

Polymerization 0.05 g of the catalyst of example 19 was precontacted with 0.42 g of MAO in 100 cm$^3$ of toluene for 5 minutes at 30° C. The catalyst was fed into an autoclave previously purged with propylene (3 treatment with 5 bar of propylene). 1000 cm$^3$ of H$_2$ and 2300 cm$^3$ of propylene were fed and the temperature was set at 70° C. Polymerization was carried out for 2 hours. About 330 g of spherical form propylene was obtained (yield 6521 g polypropylene/g cat.; 1976 Kg/g Zr) with the following characteristics:

xylene insolubles=74.1%

EXAMPLE 22

Preparation of the support

Same procedure as in example 1.

Preparation of the metallocene/MAO solution

Same procedure as in example 4.

Preparation of the catalyst 100 g of the above described support was fed to a 1 liter reactor which contained 600 cm$^3$ of toluene. 10 cm$^3$ of diisobutylphthalate was fed at 20° C.; the mixture was than heated at 40° C. for 2 hours. 70.5 cm$^3$ of the above described metallocene/MAO solution was then fed and the mixture was kept at 40° C. for 4 hours under stirring. After removal of the solvent under vacuum, 115 g of spherical catalyst was obtained with the following characteristics:

Zr=0.7%; Al=3.44%; Ti=0.17%; Cl=1.41%; Mg=0.22%

Polymerization

The above described catalyst was polymerized as in example 8. 290 g of spherical from copolymer (yield 5300 g copolymer/g cat.; 732 Kg/g Zr) was obtained, with the following characteristics:

MIE=0.088; F/E=151.3; η=1.48; actual density=0.910; insolubles in xylene=90.4; Mw/Mn=4.4

EXAMPLE 23

In a 2.5 l stainless steel reactor the following reactants were fed at 30° C.: propane=10 Kg/hr.; TIBAL=33.6 g/hr.; MAO=5.6 g/hr.; catalyst of example 1=3 g/hr. The average residence time 7 minutes. The mixture was then fed to a fluidized bed reactor having a volume of 350 liters. Polymerization was carried out at 80° C. and 24 bar by feeding propane (23 Kg/hr.), ethylene (15 Kg/hr), butene (5 Kg/hr.). A spherical form polymer was obtained (yield 6000 g polymer/g cat.), with the following features:

actual density=0.919 g/cm$^3$; bulk density=0.363 g/cm$^3$; bound butene=6%; insolubles in xylene=95.6%; CC content<5 ppm.

We claim:

1. Components of catalysts for the polymerization of olefins comprising the product obtained by bringing a compound of a transition metal M selected from Ti, V, Zr and Hf containing at least one M—π bond into contact with a prepolymer, said prepolymer obtained by polymerization with a coordination catalyst of one or more olefins CH$_2$=CHR, in which R is hydrogen or an alkyl, cycloalkyl or aryl with 1–12 carbon atoms, and/or of one or more di- or polyenes, said coordination catalyst comprising the product obtained by contacting a compound of Ti, V, Zr or Hf with a magnesium halide, said magnesium halide being in the form of particles having crystallites with an average size below 300 Å, said magnesium halide being present in said prepolymer in an amount of between 50 and 50000 ppm.

2. Components of catalysts according to claim 1 in which the compound of the transition metal M contains at least one ligand L coordinated on the metal M, the said ligand L possessing a mono- or polycyclic structure containing conjugated π electrons.

3. Components of catalysts according to claim 1 in which the atomic ratio M/Mg is greater than 0.1.

4. Components of catalysts according to claim 3 in which the ratio M/Mg is between 0.3 and 3.

5. Components of catalysts according to claim 1 in which the crystallites of the Mg halide are less than 150 Å in size.

6. Components of catalysts according to claim 1 in which the Mg halide is MgCl$_2$.

7. Components of catalysts according to claim 1 in which the transition metal compound is selected from among compounds with the structure:

$$Cp^I MR^1_a R^2_b R^3_c \quad (I)$$

$$Cp^I Cp^{II} MR^1_a R^2_b \quad (II)$$

$$Cp^I-A_c-Cp^{II})M^1R^1_aR^2_b \quad (III)$$

in which M is Ti, V, Zr or Hf; Cp$^I$ and Cp$^{II}$, which may be identical or different from each other, are cyclopentadienyl groups which may be substituted; two or more substituents on the said cyclopentadienyl groups can form one or more rings having from 4 to 6 carbon atoms; R$^1$, R$^2$ and R$^3$, which may be identical or different, are atoms of hydrogen, halogen, an alkyl or alkoxyl group with 1–20 carbon atoms, aryl, alkaryl, or aralkyl with 6–20 carbon atoms, an acyloxy group with 1–20 carbon atoms, an allyl group, or a substituent containing a silicon atom; A is an alkenyl bridge or has a structure chosen from:

$$-M_1-,\quad -M_1-M_1-,\quad -O-M_1-O-,$$
with substituents $R_1$ (above) and $R_1$, $R_2$, $R_2$, $R_2$ respectively $$-C-M_1-,\quad =BR_1,\quad =AlR_1,$$
with substituents $R_1,R_1$ above and $R_2,R_2$ below —Ge—, —Sn—, —O—, —S—, =SO$_2$, =SO$_2$, =NR$_1$, =PR$_1$, or =P(O)R$_1$, in which M$_1$ is Si, Ge, or Sn; R$_1$ and R$_2$, which may be identical or different, are alkyl groups with 1–4 carbon atoms or aryl groups with 6–10 carbon atoms; a, b, c are, independently, integers from 0 to 4; e is an integer from 0 to 6 and two or more of the radicals R$^1$, R$^2$ and R$^3$ can form a ring.

8. Components of catalysts according to claim 7 in which the transition metal compound is chosen from the following compounds:

(Me$_5$Cp)MMe$_3$, (Me$_5$Cp)M(OMe)$_3$, (Me$_5$Cp)MCl$_3$, (Cp)MCl$_3$, (Cp)MMe$_3$, (MeCp)MMe$_3$, (Me$_3$Cp)MMe$_3$, (Me$_4$Cp)MCl$_3$, (Ind)MBenz$_3$, (H$_4$Ind)MBenz$_3$, (Cp)MBu$_3$.

9. Components of catalysts according to claim 7 in which the transition metal compound is chosen from the following compounds:

(Cp)$_2$MMe$_2$, (Cp)$_2$MPh$_2$, (Cp)$_2$MEt$_2$, (Cp)$_2$MCl$_2$, (Cp)$_2$M(OMe)$_2$, (Cp)$_2$M(OMe)Cl, (MeCp)$_2$MCl$_2$, (Me$_5$Cp)$_2$MCl$_2$, (Me$_5$Cp)$_2$MMe$_2$, (Me$_5$Cp)$_2$MMeCl, (Cp)(Me$_5$Cp)MCl$_2$, (1-MeFlu)$_2$MCl$_2$, (BuCp)$_2$MCl$_2$, (Me$_3$Cp)$_2$MCl$_2$, (Me$_4$Cp)$_2$MCl$_2$, (Ne$_5$Cp)$_2$M(OMe)$_2$, (Me$_5$Cp)$_2$M(OH)Cl, (Me$_5$Cp)$_2$M(OH)$_2$, (Me$_5$Cp)$_2$M(C$_6$H$_5$)$_2$, (Me$_5$Cp)$_2$M(CH$_3$)Cl, (EtMe$_4$Cp)$_2$MCl$_2$, [(C$_6$H$_5$)Me$_4$Cp]$_2$MCl$_2$, (Et$_5$Cp)$_2$MCl$_2$, (Me$_5$Cp)$_2$M(C$_6$H$_5$)Cl, (Ind)$_2$MCl$_2$, (Ind)$_2$MMe$_2$, (H$_4$Ind)$_2$MCl$_2$, (H$_4$Ind)$_2$MMe$_2$, {[Si(CH$_3$)$_3$]Cp}$_2$MCl$_2$, {[Si(CH$_3$)$_3$]$_2$Cp}$_2$MCl$_2$, (Me$_4$Cp)(Me$_5$Cp)MCl$_2$.

10. Components of catalysts according to claim 7 in which the transition metal compound is chosen from the following compounds:

C$_2$H$_4$(Ind)$_2$MCl$_2$, C$_2$H$_4$(Ind)$_2$MMe$_2$, C$_2$H$_4$(H$_4$Ind)$_2$MCl$_2$, C$_2$H$_4$(H$_4$Ind)$_2$MMe$_2$, Me$_2$Si(Me$_4$Cp)$_2$MCl$_2$, Me$_2$Si $(Me_4Cp)_2MMe_2$, $Me_2SiCp_2MCl_2$, $Me_2SiCp_2MMe_2$, $Me_2Si(Me_4Cp)_2MMeOMe$, $Me_2Si(Flu)_2MCl_2$, $Me_2Si(2-Et-5-iPrCp)_2MCl_2$, $Me_2Si(H_4Ind)_2MCl_2$, $Me_2Si(H_4Flu)_2MCl_2$, $Me_2SiCH_2(Ind)_2MCl_2$, $Me_2Si(2-Me-H_4Ind)_2MCl_2$, $Me_2Si(2-MeInd)_2MCl_2$, $Me_2Si(2-Et-5-iPr-Cp)_2MCl_2$, $Me_2Si(2-Me-5-EtCp)_2MCl_2$, $Me_2Si(2-Me-5-Me-Cp)_2MCl_2$, $Me_2Si(2-Me-4,5-benzoindenyl)_2MCl_2$, $Me_2Si(4,5-benzoindenyl)_2MCl_2$, $Me_2Si(2-EtInd)_2MCl_2$, $Me_2Si(2-iPr-Ind)_2MCl_2$, $Me_2Si(2-t-butyl-Ind)MCl_2$, $Me_2Si(3-t-butyl-5-MeCp)_2MCl_2$, $Me_2Si(3-t-butyl-5-MeCp)_2MMe_2$, $Me_2Si(2-MeInd)_2MCl_2$, $C_2H_4(2-Me-4,5-benzoindenyl)_2MCl_2$, $Me_2C(Flu)CpMCl_2$, $Ph_2Si(Ind)_2MCl_2$, $Ph(Me)Si(Ind)_2MCl_2$, $C_2H_4$-$(H_4Ind)M(NMe_2OMe$, isopropylidene-(3-t-butylCp)(Flu)MCl_2$, $Me_2C(Me_4Cp)(MeCp)MCl_2$, $MeSi(Ind)_2MCl_2$, $Me_2Si(Ind)_2MMe_2$, $Me_2Si(Me_4Cp)_2MCl(OEt)$, $C_2H_4(Ind)_2M(NMe_2)_2$, $C_2H_4(Me_4Cp)_2MCl_2$, $C_2Me_4(Ind)_2MCl_2$, $Me_2Si(3-Me-Ind)_2MCl_2$, $C_2H_4(2-Me-Ind)_2MCl_2$, $C_2H_4(3-Me-Ind)_2MCl_2$, $C_2H_4(4,7-Me_2-Ind)_2MCl_2$, $C_2H_4(5,6-Me_2-Ind)_2MCl_2$, $C_2H_4(2,4,7-Me_3-Ind)_2MCl_2$, $C_2H_4(3,4,7-Me_3Ind)_2MCl_2$, $C_2H_4(2-Me-H_4Ind)_2MCl_2$, $C_2H_4(4,7-Me_2-H_4Ind)MCl_2$, $C_2H_4(2,4,7-Me_3-H_4Ind)_2MCl_2$, $Me_2Si(4,7-Me_2-Ind)_2MCl_2$, $Me_2Si(5,6-Me_2-Ind)_2MCl_2$, $Me_2Si(2,4,7-Me_3-H_4Ind)_2MCl_2$.

11. Components of catalysts according to claim 1 in which the prepolymer is obtained with a catalyst whose solid component is in the form of spherical particles with size below 100 micron, nitrogen porosity above 0.3 cm³/g and surface area greater than 200 m²/g.

12. Components of catalysts according to claim 1 in which the prepolymer is obtained with a catalyst whose solid component is in the form of spherical particles with size below 100 micron, surface area less than 200 m²/g and mercury porosity between 0.5 and 2 cc/g.

13. Components of catalysts according to claim 1 in which the prepolymer has a mercury porosity, referred to pores with radius of up to 50,000 Å, greater than 0.3 cm³/g.

14. Components of catalysts according to claim 13 in which the prepolymer has a mercury porosity, referred to pores with radius of up to 50,000 Å, greater than 0.4 cm³/g.

15. Components of catalysts according to claim 14 in which the prepolymer has a mercury porosity, referred to pores with radius of up to 50,000 Å, greater than 0.5 cm³/g.

16. Components of catalysts according to claim 11 in which the content of titanium in the solid component is greater than 1 wt. %.

17. Components of catalysts according to claim 1 that can be obtained by bringing the olefinic prepolymer into contact with a solution in a hydrocarbon solvent of the compound of the transition metal M and of an Al-alkyl compound selected from Al-trialkyls and polyalkylalumoxanes in which the molar ratios Al/compound of transition metal M are greater than 2.

18. Components of catalysts for the polymerization of olefins comprising an olefinic prepolymer containing in dispersion a magnesium halide, said magnesium halide being in the form of particles having crystallites with an average size less than 300 Å and a compound of a transition metal M, chosen from Ti, V, Zr and Hf, containing at least one M—π bond, in which the compound of the transition metal M is present in a form at least partly combined with the magnesium halide and in which the atomic ratio M/Mg is greater than 0.1.

19. Catalysts for the polymerization of olefins comprising the product of the reaction of a component according to claim 1 with an Al-alkyl compound chosen from Al-trialkyl in which the alkyl groups have from 1 to 12 carbon atoms and linear or cyclic alumoxane compounds containing the repeating unit —(R$_4$)AlO—, in which R$_4$ is an alkyl group with 1–6 carbon atoms or a cycloalkyl or aryl group with 6–10 carbon atoms and containing from 2 to 50 repeating units.

20. Catalysts for the polymerization of olefins comprising the product of the reaction of a component according to claim 18 with an Al-alkyl compound chosen from Al-trialkyl in which the alkyl groups have from 1 to 12 carbon atoms and linear or cyclic alumoxane compounds containing the repeating unit —(R$_4$)AlO—, in which R$_4$ is an alkyl group with 1–6 carbon atoms or a cycloalkyl or aryl group with 6–10 carbon atoms and containing from 2 to 50 repeating units.

21. Catalysts according to claim 19 in which the Al-alkyl compound is a mixture of Al-trialkyl and an alumoxane.

22. Catalysts according to claim 19 in which the alumoxane is polymethylalumoxane.

23. Catalyst according to claim 19 in which the Al-trialkyl compound is reacted with 0.5–0.01 mol of water per mole of Al-trialkyl and in which the compound of transition metal M is chosen from among:

$C_2H_4(Ind)_2MCl_2$, $C_2H_4(Ind)_2MMe_2$, $C_2H_4(H_4Ind)_2MCl_2$, $C_2H_4(H_4Ind)_2MMe_2$, $Me_2Si(Me_4Cp)_2MCl_2$, $Me_2Si(Me_4Cp)_2MMe_2$, $Me_2SiCp_2MCl_2$, $Me_2SiCp_2MMe_2$, $Me_2Si(Me_4Cp)_2MMeOMe$, $Me_2Si(Flu)_2MCl_2$, $Me_2Si(2-Et-5-iPrCp)_2MCl_2$, $Me_2Si(H_4Ind)_2MCl_2$, $Me_2Si(H_4Flu)_2MCl_2$, $Me_2SiCH_2(Ind)_2MCl_2$, $Me_2Si(2-Me-H_4Ind)_2MCl_2$, $Me_2Si(2-MeInd)_2MCl_2$, $Me_2Si(2-Et-5-iPr-Cp)_2MCl_2$, $Me_2Si(2-Me-5-EtCp)_2MCl_2$, $Me_2Si(2-Me-5-Me-Cp)_2MCl_2$, $Me_2Si(2-Me-4,5-benzoindenyl)_2MCl_2$, $Me_2Si(4,5-benzoindenyl)2MCl_2$, $Me_2Si(2-EtInd)_2MCl_2$, $Me_2Si(2-iPr-Ind)_2MCl_2$, $Me_2Si(2-t-butyl-Ind)MCl_2$, $Me_2Si(3-t-butyl-S-MeCp)_2MCl_2$, $Me_2Si(3-t-butyl-5-MeCp)_2MMe_2$, $Me_2Si(2-MeInd)_2MCl_2$, $C_2H_4(2-Me-4,5-benzoindenyl)_2MCl_2$, $Me_2C(Flu)CpMCl_2$, $Ph_2Si(Ind)_2MCl_2$, $Ph(Me)Si(Ind)_2MCl_2$, $C_2H_4(H_4Ind)M(NMe_2)OMe$, isopropylidene-(3-t-butylCp)(Flu)MCl_2$, $Me_2C(Me_4Cp)(MeCp)MCl_2$, $MeSi(Ind)_2MCl_2$, $Me_2Si(Ind)_2MMe_2$, $Me_2Si(Me_4Cp)_2MCl(OEt)$, $C_2H_4(Ind)_2M(NMe_2)_2$, $C_2H_4(Me_4Cp)_2MCl_2$, $C_2Me_4(Ind)_2MCl_2$, $Me_2Si(3-Me-Ind)2MCl_2$, $C_2H_4(2-Me-Ind)_2MCl_2$, $C_2H_4(3-Me-Ind)_2MCl_2$, $C_2H_4(4,7-Me_2-Ind)_2MCl_2$, $C_2H_4(5,6-Me_2-Ind)_2MCl_2$, $C_2H_4(2,4,7-Me_3Ind)_2MCl_2$, $C_2H_4(3,4,7-Me_3Ind)_2MCl_2$, $C_2H_4(2-Me-H_4Ind)_2MCl_2$, $C_2H_4(4,7-Me_2-H_4Ind)_2MCl_2$, $C_2H_4(2,4,7-Me_3-H_4Ind)_2MCl_2$, $Me_2Si(4,7-Me_2-Ind)_2MCl_2$, $Me_2Si(5,6-Me_2-Ind)_2MCl_2$, $Me_2Si(2,4,7-Me_3-H_4Ind)_2MCl_2$.

* * * * *